(12) United States Patent
Persing et al.

(10) Patent No.: US 11,475,885 B2
(45) Date of Patent: Oct. 18, 2022

(54) SYSTEM FOR INTRODUCING SCALABILITY OF AN ACTION-TOPIC APPROACH TO DERIVING INTENTS FROM UTTERANCES

(71) Applicant: Bank of America Corporation, Charlotte, NC (US)

(72) Inventors: Isaac Persing, Dallas, TX (US); Emad Noorizadeh, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 269 days.

(21) Appl. No.: 16/883,630

(22) Filed: May 26, 2020

(65) Prior Publication Data

US 2021/0375271 A1 Dec. 2, 2021

(51) Int. Cl.
  *G10L 15/22* (2006.01)
  *G10L 15/18* (2013.01)
  *G06F 16/33* (2019.01)

(52) U.S. Cl.
  CPC ...... *G10L 15/1815* (2013.01); *G06F 16/3344* (2019.01); *G10L 15/22* (2013.01); *G10L 2015/223* (2013.01)

(58) Field of Classification Search
  CPC .............. G10L 15/1815; G10L 15/22; G10L 2015/223; G06F 16/3344
  See application file for complete search history.

(56) References Cited

U.S. PATENT DOCUMENTS

| | | | | |
|---|---|---|---|---|
| 10,838,954 | B1* | 11/2020 | Santos | G10L 15/22 |
| 11,087,742 | B1* | 8/2021 | Levy | G10L 15/063 |
| 2018/0364975 | A1* | 12/2018 | Kwong | G06F 3/167 |
| 2019/0155947 | A1* | 5/2019 | Chu | G06N 5/04 |
| 2020/0236068 | A1* | 7/2020 | TeNyenhuis | G06F 40/30 |

* cited by examiner

*Primary Examiner* — Abul K Azad
(74) *Attorney, Agent, or Firm* — Weiss & Arons LLP

(57) ABSTRACT

Methods for mapping intents to utterances using a three-tiered system is provided. Methods may include receiving a plurality of predetermined action-topic pairs and a plurality of predetermined intents. Methods may include mapping the plurality of predetermined action-topic pairs to the plurality of predetermined intents via a one-to-many mapping. Methods may include receiving a linguistic utterance at a first tier of the three-tiered system. Methods may include translating the linguistic utterance at the first tier of the three-tiered system. Methods may include mapping the textual representation to one or more action-topic pairs included in the plurality of action-topic pairs. The mapping may be executed at the second tier of the three-tiered system. Methods may include identifying one or more intents that correlate to the textual representation. The identifying may be executed at the third tier. The identifying may be based on the mapping between the action-topics pairs and the predetermined intents.

16 Claims, 2 Drawing Sheets

SYSTEM FOR INTRODUCING SCALABILITY OF AN ACTION-TOPIC APPROACH TO DERIVING INTENTS FROM UTTERANCES

FIELD OF TECHNOLOGY

This disclosure relates to intent extraction from linguistic utterances.

BACKGROUND OF THE DISCLOSURE

Interactive voice response ("IVR") units receive utterances from human callers. These utterances typically correspond to the reason/intent for the human caller's call. These interactive voice response units use a variety of techniques to correctly discern the meaning of the utterance, or the intent of the human caller's utterances.

These IVR units require large amounts of labeled training data to prime the units. Labeled training data may be utterances tagged with an intent. For example, a labeled training data element may be the utterance: what is my account balance? labeled with the intent: service intent—get account balance. In conventional training systems, a human being labels each utterance with an intent. Each labeled utterance is then transmitted to the IVR units. The IVR units use the large amount of labeled utterances to identify the intent of a live utterance received from a human caller.

Human labeling of intents is highly resource-consumptive and error-prone. Also, the number of predefined intents has been increasing. As such, expert knowledge and large amounts of resources—e.g., computer processing time—are required to correctly label training utterances.

Therefore, it may be desirable to utilize a scalable action-topic pair approach to label the training utterances, and thereby correctly identify the meaning of an utterance.

It would be further desirable for the scalable action-topic pair approach to include three tiers.

It would be yet further desirable for the first tier to receive one or more linguistic utterances. It would be desirable for the first tier to translate the received linguistic utterances into one or more textual representations.

It would be still further desirable for the second tier to map the one or more textual representations to one or more action-topic pairs.

It would be still yet further desirable for the third tier to identify one or more intents that correlate to the textual representation. The identification of the one or more intents may be based on the mapping executed at the second tier.

Such a three-tiered scalable action-topic pair approach may reduce the resources used to correctly determine the intent of an utterance.

SUMMARY OF THE DISCLOSURE

A three-tiered system for mapping intents to utterances is provided. The three-tiered system may include a one-to-many map between a plurality of predetermined action-topic pairs and a plurality of predetermined intents.

The three-tiered system may include a first tier. The first tier may be operable to receive a plurality of utterances. The first tier may be operable to translate the plurality of utterances into a plurality of textual representations.

The three-tiered system may also include a second tier. The second tier may be operable to map each of the plurality of textual representations to one or more action-topic pairs.

The one or more action-topic pairs may be included in the plurality of predetermined action-topic pairs.

The three-tiered system may also include a third tier. The third tier may be operable to identify one or more intents for each of the plurality of predetermined action-topic pairs. The identification may be based on the one or more action-topic pairs identified in the second tier. The identification may also be based on the one-to-many map between the plurality of predetermined action-topic pairs and plurality of predetermined plurality of intents.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
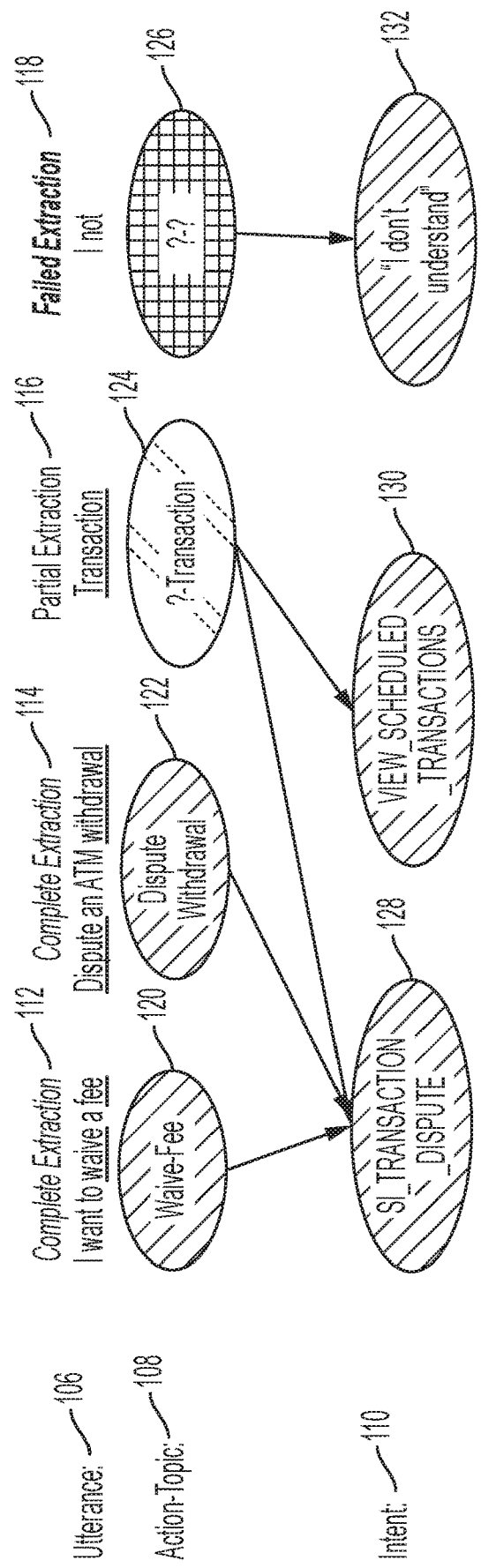
FIG. 1 shows an illustrative diagram in accordance with principles of the disclosure.

Apparatus and methods for using a three-tiered system to map intents to utterances is provided.

The method may include receiving a plurality of predetermined action-topic pairs. The predetermined action-topic pairs may be predetermined linguistic phrases. An action-topic pair may identify an action or verb, and a noun or topic and/or combination of the above. An action-topic pair may paraphrase a sentence. Examples of action-topic pairs may include: waive fee, send money, accept third party transfer, dispute withdrawal and cancel payment.

The method may also include receiving a plurality of predetermined intents. An intent may correspond to the reason or intent of utterance. The predetermined intents may include a plurality of predetermined executables. The plurality of predetermined executables may be executable by a computing system. One or more from the plurality of predetermined executables may be executable independent of a human being. Examples of the plurality of executables may include: problem_with_accepting_third_party_transfers, accept_third_party_transfer, service_intent_internal_transfer, transfer_to_external_accounts, accept_third_party_transfer, service_intent_transaction_dispute and view_scheduled_transactions.

The method may include mapping the plurality of predetermined action-topic pairs to the plurality of predetermined intents via a one-to-many mapping. As such, each action-topic pair may map to one or more intents.

The method may include receiving a linguistic utterance at a first tier of the three-tiered system. The first tier of the three-tiered system may include an IVR system, an internet chat forum or any other suitable system. As such, the linguistic utterance may be received at an IVR system, an internet chat forum or any other suitable system.

A translation module may be linked to, or included in, the IVR system, internet chat system or other suitable system. The translation module may translate the linguistic utterance into a textual representation.

The method may also include mapping the textual representation to one or more action-topic pairs included in the plurality of action-topic pairs. The mapping may be executed at the second tier of the three-tiered system. The mapping between the textual representation and the one or more action-topic pairs may be based, in part or in whole, on key words included in both the textual representation and the action-topic pairs. The mapping between the textual representation and the one or more action-topic pairs may also be based, in part or in whole, on historical data. The following example illustrates mapping a textual representation to an action-topic pair using both key word matching and historical data. The textual representation of an utterance received from a user may include the word account. Based on historical utterances received from the user, the system may determine that the word account corresponds to a specific type of account: a checking account. As such, the mapping may be individualized for the user, and may include a correlation between the word account in an utterance and the phrase checking account in an action-topic pair.

In some embodiments, the second tier may fail to map a textual representation to one of the action-topic pairs. In such embodiments, the method may include identifying the textual representation as a failed textual representation. An error and/or failed message may be generated. The error and/or failed message may be presented to a user that transmitted the utterance that mapped to the failed textual representation.

The method may also include identifying one or more intents that correlate to the textual representation. The identification may be executed at a third tier of the three-tiered system. The identification may be based on the mapping between the plurality of action-topic pairs and the plurality of predetermined intents.

The method may include displaying the one or more intents that correlate to the textual representation. The displaying may be executed on an application running on a smartphone, tablet, personal computer and/or any other suitable computing device.

The system may enable selection of one of the plurality of intents in the event that a plurality of intents corresponds to the one or more action-topic pairs. For example, a user transmitted a predetermined utterance to an IVR system. The utterance successfully mapped to three intents, via the textual representation and the plurality of action-topic pairs. Accordingly, the IVR system may present the user all three intents. The user may select one of the intents that correlate to intent of the utterance. The selection may be stored in the IVR system as historical data.

In certain embodiments, the selected intent may include a query. In such embodiments, the method may include identifying a response to the query. The method may further include transmitting the identified response. The identified response may be transmitted to a user that transmitted the query.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows an overview for scalable action-topic approaches according to the embodiments. As shown at 102, action-topic pairs may provide sufficient information for intent classification.

As shown at 104, an action-topic approach may automatically extract action-topic pairs from utterances. The extracted action-topic pairs may then be used to extract an intent. The intent extraction may be a complete extraction, a partial extraction or a failed extraction.

A complete extraction may be successfully executed when an utterance directly maps to one or more action-topics, and the one or more action-topics directly maps to a single intent. Such a direct mapping may also be referred to herein as a direct pairing between utterance to action-topic(s) and between action-topic(s) to intent. As such, a complete extraction of an utterance may obtain a single intent that corresponds to the utterance.

A partial extraction may be successfully executed when an utterance maps to a plurality of action-topics, and the plurality of action-topics maps to a plurality of intents.

Such a mapping may include a disambiguation layer and/or suggest intents layer. The disambiguation layer may use the identified plurality of action-topics in conjunction with machine learning, artificial intelligence and/or historical data to remove the uncertainty of the meaning of the utterance. The suggest intents layer may present, to a user, a list of probable intents. The list of probable intents may be based on the identified plurality of action-topics in conjunction with machine learning, artificial intelligence and/or historical data. A user may select an intent from the list of probable intents.

A failed extraction may be executed when the system is unable to identify at least one action-topic that corresponds to the utterance. In response to a failed extraction, the system may present the presenter of the utterance with a failed extraction response, such as "I don't understand" or "please repeat."

A graphic is shown at the lower half of FIG. 1. Complete extraction 112, complete extraction 114, partial extraction 116 and failed extraction 118 are shown on the x-axis of the graphic. Utterances 106, action-topics 108 and intents 110 are shown on the y-axis.

Complete extraction 112 shows an example of a complete extraction from an utterance to an intent via an action-topic. The utterance shown within the complete extraction 112 row is "I want to waive a fee." The system may map the action-topic "waive-fee," shown at 120, to the utterance "I want to waive a fee." The mapping between the action-topic and the utterance may be based on the words that are included in both the utterance and the action-topic.

Action-topic "waive-fee," shown at 120, may map to the intent "si_transaction_dispute." It should be appreciated that si may be an acronym for service intent. The intent "si_transaction_dispute" may relate to disputing a transaction. As such, the utterance "I want to waive a fee" may be correctly labeled with the intent "si_transaction_dispute."

Complete extraction 114 shows an example of a complete extraction from an utterance to an intent via an action-topic. The utterance shown within the complete extraction 114 row is "Dispute an ATM withdrawal." The system may map the action-topic "dispute withdrawal," shown at 122, to the utterance "Dispute an ATM withdrawal." The mapping between the action-topic and the utterance may be based on the words that are included in both the utterances and the action-topic.

Action-topic "dispute withdrawal," shown at 128 may map to the intent "si_transaction_dispute." The intent "si_transaction_dispute" may relate to disputing a transaction. As such the utterance "Dispute an ATM withdrawal" may be correctly labeled with the intent "si_transaction_dispute."

Partial extraction 116 shows an example of a partial extraction from an utterance to a plurality of intents via an action-topic. The utterance shown within partial extraction row 116 is "transaction." The system may map the utterance "transaction" to an action-topic "?—transaction," shown at 124. The action-topic "?-transaction" may be an action-topic that represents a plurality of various action-topics relating to a transaction. The action-topic "?-transaction," shown at 124, may map to the intent "si_transaction_dispute," shown at 128. The intent "si_transaction_dispute" may indicate a request to dispute a transaction.

The action topic "?-transaction," shown at 124, may also map to the intent "view_scheduled_transactions," shown at 130. The intent "view_scheduled_transactions," may indicate a request to view scheduled transactions.

The intent of the action-topic "?-transaction" may map to multiple intents—i.e., "si_transaction_dispute" and "view_scheduled_transactions." As such, in order to determine one single intent of the utterance "transaction," a disambiguation layer and/or a suggest intents layer may be executed.

A disambiguation layer may use the identified plurality of action-topics in conjunction with machine learning, artificial intelligence and/or historical data to remove the uncertainty of the meaning of the utterance. The suggest intents layer may present to a user a list of probable intents. The list of probable intents may be based on the identified plurality of action-topics in conjunction with machine learning, artificial intelligence and/or historical data. A user may select an intent form the list of probable intents.

In an example, a user may present the following utterance: what is my account balance. The three-tiered system may map the utterance to three action-topics: get_checking_account_balance, get_savings_account_balance, and get_money_market_account_balance. The system may identify, using artificial intelligence, machine learning and historical data, that the user requests the checking account balance on weekdays at, or around, 9:00 AM. The system may also identify, using artificial intelligence, machine learning and historical data, that the user requests the savings account balance on weekends at, or around, 12:00 PM. As such, when the utterance is received on weekdays at, or around, 9:00 AM, the system may directly map the utterance to the action-topic: get_checking_account_balance. Also, when the utterance is received on weekends at, or around, 12:00 PM, the system may directly map the utterance to the action-topic: get_savings_account_balance.

In the event that the utterance is received outside of the identified time slots, the system may present the following three intents to the user: retrieve checking account balance, retrieve savings account balance and retrieve money market account balance. The three intents may be associated with the three action-topics: (get_checking_account_balance, get_savings_account_balance, and get_money_market_account_balance. The user may select an intent from the three intents.

Failed extraction 118 shows a failed extraction process. The utterance shown within failed extraction row 118 may be "I not." The utterance "I not" may not map to an action-topic, as indicated by the question marks within an action-topic bubble, shown at 126. As such, the system may determine that the intent of the phrase is "I don't understand," as shown at 132. The system may present the user with the phrase "I don't understand," or any other suitable phrase.

Figure 2:
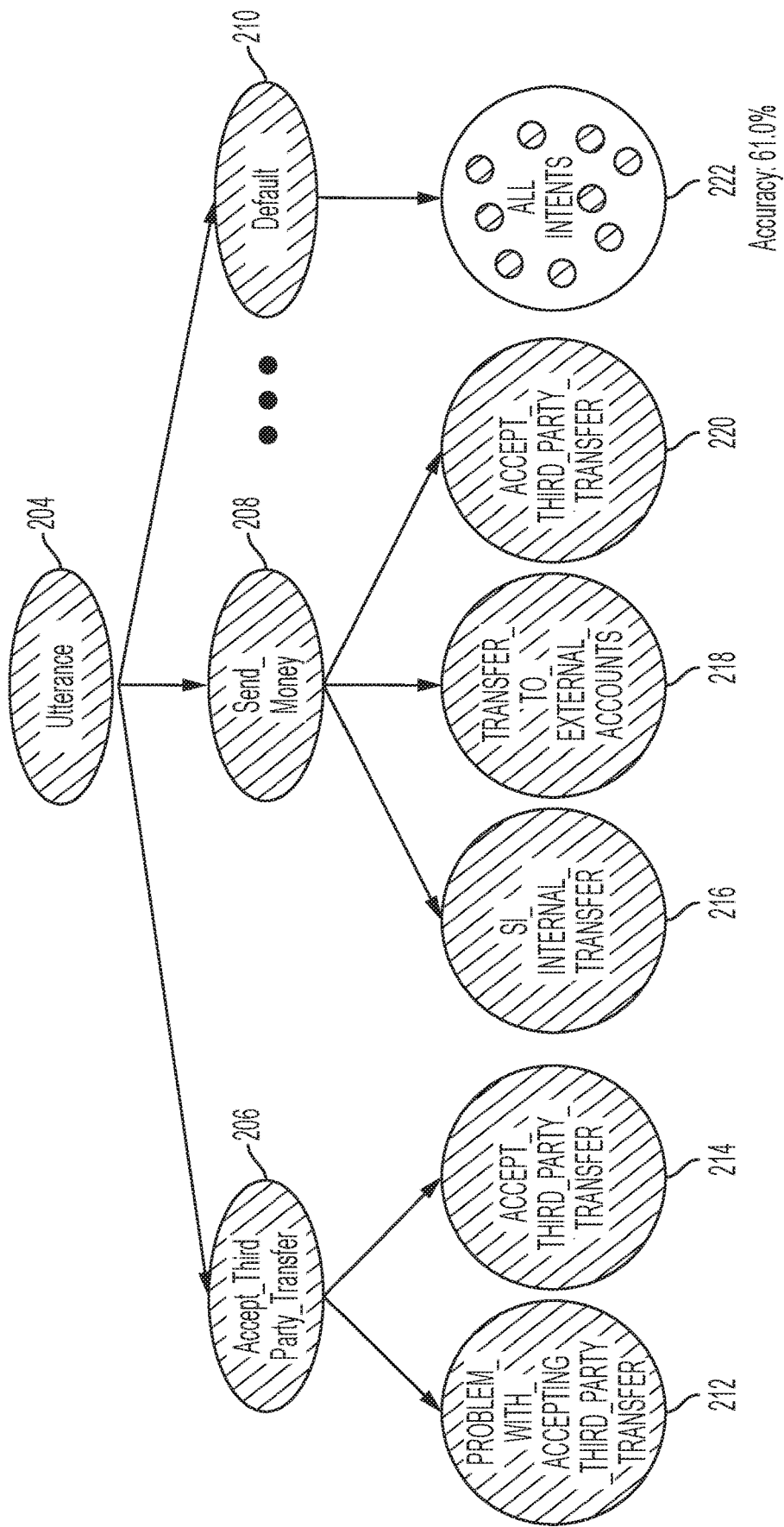
FIG. 2 shows another illustrative diagram in accordance with principles of the disclosure.

FIG. 2 shows several approaches of action-topic to intent mapping, as shown at 202. The approach shown may include a semi-manually constructed hierarchical classifier for intent prediction.

An exemplary utterance may be shown at 204. The utterance may map to one or more action-topics. As such, utterance 204 may map to action-topic "accept-third_party_transfer," shown at 206. Utterance 204 may map to action topic "send money," shown at 208. Utterance 204 may map to the default venue, shown at 210.

Action-topic "accept_third_party_transfer," shown at 206, may be associated with the following intents: "problem_with_accepting_third_party_transfer," shown at 212, and "accept_third_party_transfer," shown at 214. As such, in the event that utterance 204 relates to accepting third party transfers, the user may be presented with one or both of the following intents: problem with accepting third party transfer intent, shown at 212, or accepting third party transfer intent, shown at 214.

Action-topic "send money," shown at 208, may be associated with the following intents: "si_internal_transfer," shown at 216, "transfer_to_external_accounts," shown at 218, and/or "accept_third_party_transfer," shown at 220. As such, in the event that utterance 204 relates to accepting third party transfers, the user may be presented with one or more of the following intents: internal transfer intent, shown at 216, transfer_to_external_accounts intent, shown at 218 and/or accepting third party transfer intent, shown at 220.

At times, an action-topic may not be used. As such, the utterance may be directly mapped to an intent from a plurality of intents. Default action-topic 210 may indicate that the utterance is being directly mapped to an intent. All intents 222 may include the plurality of intents. The accuracy of such an utterance to intent mapping may be 61.0%, while the accuracy of using utterance to action-topic to intent mapping may be higher.

Thus, a system for introducing scalability of an action-topic approach to deriving intents from utterances is provided. Persons skilled in the art will appreciate that the present invention can be practiced by other than the described embodiments, which are presented for purposes of illustration rather than of limitation. The present invention is limited only by the claims that follow.

What is claimed is:

1. A three-tiered system for mapping intents to utterances, the system comprising:
 a one-to-many map between a plurality of predetermined action-topic pairs and a plurality of predetermined intents;
 a first tier operable to:
   receive a plurality of utterances; and
   translate the plurality of utterances into a plurality of textual representations;

a second tier operable to:
  map each of the plurality of textual representations to one or more action-topic pairs included in the plurality of predetermined action-topic pairs; and
a third tier operable to:
  for each of the plurality of textual representations, based on the one-to-many map between the plurality of predetermined action-topic pairs and the plurality of predetermined of intents, utilize the one or more action-topic pairs to identify one or more intents.

2. The system of claim 1, the identified one or more intents comprise two or more intents, and the system further comprises a transmitter operable to transmit the identified one or more intents for selection.

3. The system of claim 2, further comprising a receiver operable to receive a selection of one of the identified one or more intents.

4. The system of claim 3, wherein:
the selected intent is a query;
the system identifies a response to the query; and
the transmitter transmits the identified response.

5. The system of claim 1, wherein the second tier fails to map at least one from the plurality of textual representations to one or more of the plurality of predetermined action-topic pairs, the second tier identifies the at least one of the plurality of textual representations as a failed textual representation.

6. A method for mapping intents to utterances using a three-tiered system, the method comprising:
  receiving a plurality of predetermined action-topic pairs and a plurality of predetermined intents;
  mapping the plurality of predetermined action-topic pairs to the plurality of predetermined intents via a one-to-many mapping;
  receiving, at a first tier of the three-tiered system, a linguistic utterance;
  translating, at the first tier of the three-tiered system, the linguistic utterance into a textual representation;
  mapping, at a second tier of the three-tiered system, the textual representation to one or more action-topic pairs included in the plurality of action-topic pairs; and
  identifying, at a third tier of the three-tiered system, based on the mapping between the plurality of action-topic pairs and the plurality of predetermined intents, one or more intents that correlate to the textual representation.

7. The method of claim 6, further comprising displaying the one or more intents that correlate to the textual representation.

8. The method of claim 7, further comprising receiving a selection of one of the one or more intents that correlate to the textual representation.

9. The method of claim 8, wherein the selected intent is a query, and the method further comprises:
  identifying a response to the query; and
  transmitting the identified response.

10. The method of claim 9, wherein the second tier fails to map at least one from the plurality of textual representations to one or more of the plurality of predetermined action-topic pairs, and the method further comprises identifying the at least one of the plurality of textual representations as a failed textual representation.

11. A three-tiered system for mapping intents to utterances, the system comprising:
  a one-to-many map between a plurality of predetermined action-topic pairs and a plurality of predetermined intents;
  a first tier operable to:
    receive an utterance; and
    translate the utterance into a textual representation;
  a second tier operable to:
    map the textual representation to one or more action-topic pairs included in the plurality of action-topic pairs; and
  a third tier operable to:
    based on the one-to-many map between the plurality of predetermined action-topic pairs and the plurality of predetermined intents, utilize the one or more action-topic pairs to identify one or more intents.

12. The system of claim 11, wherein the identified one or more intents comprise two or more intents, and the system further comprises a transmitter operable to transmit the identified one or more intents for selection.

13. The system of claim 12, further comprising a receiver operable to receive a selection of one of the identified one or more intents.

14. The system of claim 12, wherein a user associated with the utterance is prompted to select one of the identified one or more intents.

15. The system of claim 13, wherein:
the selected intent is a query;
the system identifies a response to the query; and
the transmitter transmits the identified response.

16. The system of claim 11, wherein the second tier fails to map the textual representation to one or more of the plurality of predetermined action-topic pairs, the second tier identifies the textual representation as a failed textual representation.

* * * * *